(12) United States Patent
Richard

(10) Patent No.: US 11,340,098 B2
(45) Date of Patent: May 24, 2022

(54) DEVICE HAVING SENSORS FOR SENSING MEASUREMENT VARIABLES OF A FLUID, IN PARTICULAR FOR ARRANGING IN A FLUID LINE

(71) Applicant: GROHE AG, Hemer (DE)

(72) Inventor: Thilo Richard, Dortmund (DE)

(73) Assignee: Grohe AG, Hemer (DE)

( * ) Notice: Subject to any disclaimer, the term of this patent is extended or adjusted under 35 U.S.C. 154(b) by 255 days.

(21) Appl. No.: 16/741,335

(22) Filed: Jan. 13, 2020

(65) Prior Publication Data
US 2020/0149937 A1    May 14, 2020

Related U.S. Application Data

(63) Continuation of application No. PCT/EP2018/064187, filed on May 30, 2018.

(30) Foreign Application Priority Data

Jul. 12, 2017   (DE) ..................... 10 2017 115 694.1

(51) Int. Cl.
*G01F 1/56* (2006.01)
*G01L 9/00* (2006.01)
*G01K 7/01* (2006.01)

(52) U.S. Cl.
CPC ............... *G01F 1/56* (2013.01); *G01K 7/01* (2013.01); *G01L 9/0005* (2013.01)

(58) Field of Classification Search
CPC .... G01F 1/56; G01F 1/28; G01K 7/01; G01L 9/0005; G01N 27/12; G01N 27/22; G01N 27/221
See application file for complete search history.

(56) References Cited

U.S. PATENT DOCUMENTS

| 5,663,508 A | 9/1997 | Sparks |
| 2002/0167322 A1* | 11/2002 | He ........................ G01N 27/07 |
| | | 324/441 |

(Continued)

FOREIGN PATENT DOCUMENTS

| DE | 3616777 A1 | 11/1987 |
| DE | 102015011755 A1 | 3/2017 |
| WO | WO2014153547 A1 | 9/2014 |

OTHER PUBLICATIONS

International Search Report dated Aug. 30, 2018 in corresponding application PCT/EP2018/064187.

*Primary Examiner* — Alvaro E Fortich
*Assistant Examiner* — Zannatul Ferdous
(74) *Attorney, Agent, or Firm* — Muncy, Geissler, Olds & Lowe, P.C.

(57) ABSTRACT

The present invention relates to a device, containing a first sensor, designed and arranged for sensing a first measurement variable of a fluid, and a second sensor, designed and arranged for sensing a second measurement variable of the fluid, a first electrode assembly has a substrate and a first planar electrode overlying the substrate. A second electrode assembly has a second planar electrode. The first planar electrode and the second planar electrode are dielectrically spaced apart from each other. The first electrode assembly and the second electrode assembly form a first capacitor as the first sensor such that a first capacitance, formed by the first planar electrode and the second planar electrode, can be varied under the influence of a fluid and in accordance with a flow velocity of the fluid as the first measurement variable.

11 Claims, 6 Drawing Sheets

(56) References Cited

U.S. PATENT DOCUMENTS

| | | | |
|---|---|---|---|
| 2011/0146425 A1* | 6/2011 | Furey | G01D 11/30 |
| | | | 73/866.5 |
| 2012/0210781 A1* | 8/2012 | Klee | G01F 1/699 |
| | | | 73/204.23 |
| 2013/0183209 A1* | 7/2013 | Richter | A61M 5/16877 |
| | | | 422/403 |
| 2014/0290381 A1 | 10/2014 | Manohara et al. | |
| 2015/0346017 A1* | 12/2015 | LePort | E21B 49/10 |
| | | | 250/577 |
| 2018/0356455 A1* | 12/2018 | Rice | G06F 9/24 |

\* cited by examiner

DEVICE HAVING SENSORS FOR SENSING MEASUREMENT VARIABLES OF A FLUID, IN PARTICULAR FOR ARRANGING IN A FLUID LINE

This nonprovisional application is a continuation of International Application No. PCT/EP2018/064187, which was filed on May 30, 2018, and which claims priority to German Patent Application No. 10 2017 115 694.1, which was filed in Germany on Jul. 12, 2017, and which are both herein incorporated by reference.

BACKGROUND OF THE INVENTION

Field of the Invention

The present invention relates to a device, having a first sensor, designed and arranged for sensing a first measurement variable of a fluid, and second sensor, designed and arranged for sensing a second measurement variable of the fluid.

Description of the Background Art

Various applications require the acquisition of measurement variables in the sanitary sector. Exemplary applications are the regulation, calibration, or programming of electronic sanitary apparatus such as electronic fittings. Furthermore, data acquisition from sanitary apparatus is also desirable for smart home applications, therefore, for systems of residential facilities with networked devices and equipment such as, for example, home technology, household appliances, and consumer electronics devices. In the state of the art, different sensors, which are available as individual components, are required for data acquisition in the sanitary sector. If these individual components are built-in, the result is often a bulky structure which is not desired, impractical, or too cost-intensive. In particular, such a structure cannot be implemented because the individual components cannot all be accommodated in the provided water supply or sanitary apparatus.

SUMMARY OF THE INVENTION

It is therefore an object of the present invention to overcome the disadvantages that results from the state of the art. A further object of the invention is to provide a device which enables sensing of at least two measurement variables of a water flow and for this purpose can be arranged in a water line or a sanitary apparatus. The device of the invention can particularly preferably be arranged in a domestic water line or in a branch of such a line or directly before a sanitary fitting. For this purpose, the device preferably has a reduced size compared with comparable prior art devices. A further object of the invention is to provide the aforementioned advantageous device, wherein it is suitable for an application for a consumption measurement; temperature monitoring, for example, for protection against freezing or scalding or both; automatic calibration of an electronic fitting; calibration of a water heater; leak detection; calibration of a water supply, for example, a pump; presence detection; and creation of a usage profile, for example, for a time-controlled hot water supply; or for a combination of at least two of the aforementioned applications. Further, it is an object of the invention to provide a device that enables the sensing of at least two measurement variables of a water flow and that can be produced more cost-effectively.

In an exemplary embodiment, a device is provided that includes a first sensor, designed and arranged for sensing a first measurement variable of a fluid, and a second sensor, designed and arranged for sensing a second measurement variable of the fluid.

The device also includes a first electrode assembly, containing a substrate and a first planar electrode overlying the substrate, and a second electrode assembly, containing a second planar electrode;

The first planar electrode and the second planar electrode are dielectrically spaced apart from each other; wherein the first electrode assembly and the second electrode assembly form a first capacitor as the first sensor such that a first capacitance, formed by the first planar electrode and the second planar electrode, can be varied under the influence of a fluid and in accordance with a flow velocity of the fluid as the first measurement variable; and wherein the first electrode assembly contains the second sensor. The first planar electrode and the second planar electrode are preferably dielectrically spaced apart from one another by less than 10 cm, more preferably by less than 5 cm, more preferably by less than 3 cm, more preferably by less than 1 cm, and most preferably by less than 5 mm. For use in this document, one component overlies another when the components follow each other in one direction. In this regard, the two components can follow one another directly or indirectly; i.e., the two components can be directly adjacent to one another or there can be one or more further components between the two components. If one component overlies another, then, however, these two components are preferably indirectly or directly connected to one another.

The device is designed to be arranged in a fluid line designed to conduct the fluid. For this purpose, the device is preferably dimensioned such that it can be inserted into the fluid line. A preferred fluid line is tubular. A preferred tubular fluid line is a water pipe, for example, a domestic water line or a drinking water line or both. The tubular fluid line preferably has an inner diameter in a range from 5 mm to 50 cm, more preferably from 5 mm to 30 cm, and most preferably from 1 cm to 20 cm.

The fluid line can be contained in a sanitary apparatus. A preferred fluid line contained in a sanitary apparatus is, for example, a water passage of the sanitary apparatus.

The second measurement variable can be a temperature of the fluid or a pressure of the fluid or both. Accordingly, the second sensor is preferably a temperature sensor or a pressure sensor or both. In the case that the second sensor is a pressure sensor, the first electrode assembly preferably contains a third sensor, which is a temperature sensor. In the case that the second sensor is a temperature sensor, the first electrode assembly preferably contains a third sensor, which is a pressure sensor.

The substrate can at least partially surround the second sensor. For this purpose, the second sensor is, for example, at least partially molded into the substrate. In this regard, the second sensor is preferably a temperature sensor. Accordingly, the second measurement variable is preferably a temperature of the fluid.

The substrate can be overlaid with at least one electrical conductive trace on a side facing away from the first planar electrode; wherein the second sensor overlies the substrate on the side facing away from the first planar electrode and is electrically conductively connected to the at least one electrical conductive trace.

The substrate can be overlaid with at least two electrical conductive traces on the side facing away from the first planar electrode, wherein the second sensor is electrically conductively connected to the at least two electrical conductive traces. According to this embodiment, the substrate is preferably designed to be electrically insulating or the at least one electrical conductive trace is electrically insulated from the substrate. To electrically insulate the at least one electrical conductive trace from the substrate, an electrically insulating layer, for example, made of plastic, can be located between the at least one electrical conductive trace and the substrate. Further, the second sensor can be a temperature sensor. Accordingly, the second measurement variable is preferably a temperature of the fluid. Here the temperature sensor is preferably designed as a semiconductor temperature sensor or as a transistor or both. A preferred transistor is connected as a diode.

The device can contain a third sensor, designed and arranged for sensing a third measurement variable of the fluid; wherein the first electrode assembly contains a third planar electrode overlying the substrate on a side facing away from the first planar electrode; wherein the substrate dielectrically spaces apart the first planar electrode and the third planar electrode from each other; wherein the first electrode assembly forms a second capacitor as the third sensor; wherein the first planar electrode and the third planar electrode form a second capacitance of the second capacitor; and wherein the substrate is arranged and designed so that the second capacitance can be varied under the influence of the fluid and in accordance with a pressure of the fluid as the third measurement variable. In this regard, the third sensor is preferably a pressure sensor. In a preferred embodiment, the substrate is formed flexible so that the second capacitance can be varied under the influence of the fluid and in accordance with the pressure of the fluid as the third measurement variable. The substrate preferably dielectrically spaces apart the first planar electrode and the second planar electrode from each other by less than 10 cm, more preferably by less than 5 cm, more preferably by less than 3 cm, more preferably by less than 1 cm, and most preferably by less than 5 mm.

The first electrode assembly can contain a third planar electrode overlying the substrate on a side facing away from the first planar electrode; wherein the substrate dielectrically spaces apart the first planar electrode and the third planar electrode from each other; wherein the first electrode assembly forms a second capacitor as the second sensor; wherein the first planar electrode and the third planar electrode form a second capacitance of the second capacitor; and wherein the substrate is arranged and designed such that the second capacitance can be varied under the influence of the fluid and in accordance with a pressure of the fluid as the second measurement variable. For this purpose, a mean distance between the first planar electrode and the third planar electrode preferably can be varied under the influence of the fluid, in particular its pressure. In this regard, the second sensor is preferably a pressure sensor. In a preferred embodiment, the substrate is designed to be flexible so that the second capacitance can be varied under the influence of the fluid and in accordance with the pressure of the fluid as the second measurement variable. The substrate preferably dielectrically spaces apart the first planar electrode and the second planar electrode from each other by less than 10 cm, more preferably by less than 5 cm, more preferably by less than 3 cm, more preferably by less than 1 cm, and most preferably by less than 5 mm.

The substrate can at least partially enclose a cavity between the first planar electrode and the third planar electrode. For this purpose, the substrate preferably contains a hole which is at least partially covered by the first planar electrode and the third planar electrode. The first electrode arrangement preferably has a vent for the cavity. Such a vent can be designed, for example, as an air-conducting channel, for example, between the substrate and the third planar electrode.

The first planar electrode or the second planar electrode or both can each have a thickness in a range from 500 nm to 3 mm, preferably from 500 nm to 1 mm, more preferably from 1 µm to 1 mm, more preferably from 1 µm to 800 µm, and most preferably from 1 µm to 500 µm.

The first electrode assembly and the second electrode assembly can form a first capacitor as the first sensor such that a mean distance between the first planar electrode and the second planar electrode can be varied under the influence of the fluid and in accordance with the flow velocity of the fluid as the first measurement variable.

The first planar electrode can have a first electrode surface facing the second planar electrode, wherein the second planar electrode has a second electrode surface facing the first planar electrode, wherein the first electrode assembly and the second electrode assembly form the first capacitor as the first sensor such that an overlapping of the first electrode surface by the second electrode surface can be varied under the influence of the fluid and in accordance with the flow velocity of the fluid as the first measurement variable.

The second planar electrode can be designed or arranged to be movable relative to the first planar electrode or both. In the case that the second planar electrode is designed to be movable relative to the first planar electrode, the second planar electrode is preferably designed to be elastically deformable by the action of the fluid. In the case that the second planar electrode is arranged to be movable relative to the first planar electrode, the second planar electrode is preferably designed to be displaceable by the action of the fluid. In this regard, the second planar electrode is preferably arranged to be movable by translation or by rotation or both. For this purpose, the second electrode assembly can have a bearing which is designed for the translational displacement of the second planar electrode or for the rotation of the second planar electrode about an axis of rotation. In this regard, the device preferably has a restoring element, which is arranged and designed to bring the mean distance between the first planar electrode or the overlapping of the first electrode surface by the second electrode surface into an equilibrium position. A preferred restoring element is a spring element.

The first planar electrode can have a first electrode surface facing the second planar electrode, wherein the second planar electrode has a second electrode surface facing the first planar electrode, wherein the second electrode surface is larger than the first electrode surface. In this regard, the first capacitance is preferably formed by portions of the first electrode surface and the second electrode surface that overlap one another in a fluid flow direction. The flow direction is preferably perpendicular to a plane formed by the first electrode surface or the second electrode surface.

The device can contain in addition a fourth sensor, designed and arranged for sensing a fourth measurement variable of the fluid. A preferred fourth measurement variable is a content of a chemical substance of the fluid or a biological substance of the fluid or both. A preferred chemical substance is an inorganic substance or an organic substance. A preferred inorganic substance is lime or a metal or both. A preferred metal is a heavy metal. In this regard, a heavy metal is a metal with a density of more than 5.0 g/cm$^3$. Examples of heavy metals are lead, cadmium, chromium, cobalt, copper, manganese, molybdenum, nickel, mercury, selenium, zinc, and tin. A preferred biological substance is a bacterium or a fungus or both. Preferred bacteria are selected from the group consisting of *Legionella, Salmonella, Campylobacter, Streptococci,* and *Escherichia coli,* or a combination of at least two of these.

A contribution to the fulfillment of at least one of the objects of the invention is made by an embodiment 1 of a measuring apparatus, containing the device according to one of the preceding claims and a signal processing device, wherein the signal processing device is arranged and designed for processing a measurement signal of the first measurement variable or the second measurement variable or both and is connected in a signal-transmitting manner to the first sensor or the second sensor or both.

The measuring apparatus preferably contains at least one auxiliary device. A preferred auxiliary device is a voltage source. The voltage source is preferably electrically conductively connected to the first planar electrode and the second planar electrode in order to apply an electrical voltage between them. A preferred voltage source is a DC voltage source or an AC voltage source or both. The signal processing device preferably contains a data processing device or is contained in a data processing device or is connected to a data processing device in a signal-transmitting or data-transmitting manner or both. The voltage source can be, for example, a power supply unit, which preferably contains a transformer.

A contribution to the fulfillment of at least one of the objects of the invention is made by a sanitary apparatus, containing the device or the measuring apparatus.

The device can be used in in a fluid line, which can be contained in a sanitary apparatus.

The device can be used for setting a/the sanitary apparatus or for monitoring the sanitary apparatus or both. A preferred setting is regulation, calibration, or programming or a combination of at least two thereof. A preferred setting further is a setting of a fluid flow or a fluid delivery or both of the sanitary apparatus, which is preferably a fitting, more preferably an electronic fitting. A preferred setting of a fluid flow or fluid delivery or both of a fitting is a setting of a flow rate of the fluid or a temperature of a fluid. A preferred temperature of a fluid is a mixed water temperature. A preferred monitoring of the sanitary apparatus includes a continuous or periodic measurement of at least one of the measurement variables of the fluid. A preferred monitoring of the sanitary apparatus includes consumption measurement, leakage detection, presence detection, and creation of a usage profile, or a combination of at least two of these. A preferred consumption measurement is a power consumption measurement or a fluid consumption measurement or both. A preferred combination of monitoring and setting the sanitary apparatus includes a continuous or periodic measuring of a temperature of the fluid and setting of a fluid flow or fluid delivery of the sanitary apparatus, which is preferably a fitting. In this way, a protective function, for example, protection from freezing or scalding or both, is preferably implemented.

Preferred components and constituents of an inventive embodiment of a category of the invention are also preferred in further embodiments of the other categories of the invention for identically named or equivalent components and constituents. Likewise, preferred features of an inventive embodiment of one category of the invention are also correspondingly preferred in further embodiments of the other categories of the invention.

Sensor

All sensors that appear suitable to the skilled artisan for the purpose of the invention may be considered as sensors of the device of the invention. A sensor is the part of a measuring device or measuring apparatus that responds directly to the measurement variable to be measured. This response to the measurement variable is also referred to herein as sensing the measurement variable. In this regard, the sensing preferably includes a change in a sensor variable due to the action of the fluid. In the case of the first sensor, the sensor variable is preferably the first capacitance. Sensors are also referred to as transducers, measurement variable sensors, or detectors. The first sensor is preferably a flow rate sensor. Thus, the first sensor can preferably be used to measure a flow rate of the fluid through a fluid line. Depending on the embodiment of the device of the invention, the second sensor can be designed, as an example and without being limiting, as a temperature sensor or a pressure sensor or both. Further, in addition to the first sensor and the second sensor and apart from the third sensor, the device of the invention can contain at least one or also a plurality of further sensors. In this regard, each additional sensor is designed for sensing a further measurement variable. The further measurement variable is in each case preferably a further measurement variable of the fluid. A preferred further measurement variable is a content of a chemical substance of the fluid or a biological substance of the fluid or both. A preferred chemical substance is an inorganic substance or an organic substance. A preferred inorganic substance is lime or a metal or both. A preferred metal is a heavy metal. In this regard, a heavy metal is a metal with a density of more than 5.0 g/cm$^3$. Examples of heavy metals are lead, cadmium, chromium, cobalt, copper, manganese, molybdenum, nickel, mercury, selenium, zinc, and tin. A preferred biological substance is a bacterium or a fungus or both. Preferred bacteria are selected from the group consisting of *Legionella, Salmonella, Campylobacter, Streptococci,* and *Escherichia coli,* or a combination of at least two of these.

Temperature Sensor

All temperature sensors that are known to the skilled artisan and that appear suitable for the use of the invention may be considered as temperature sensors. A resistance temperature sensor is preferred as the temperature sensor. A resistance temperature sensor is one that is based on a change in electrical resistance under the influence of temperature. A preferred resistance temperature sensor includes a platinum measuring resistor. Preferred resistance temperature sensors with a platinum measuring resistor are Pt100 sensors, Pt500 sensors, Pt1000 sensors, and combinations of the aforementioned sensors. Platinum measuring resistors are named according to their material and their nominal resistance at a temperature of 0° C. Thus, a Pt100 measuring resistor has a nominal resistance of 100Ω, a Pt500 measuring resistor has a nominal resistance of 500Ω, and a Pt1000 measuring resistor has a nominal resistance of 1 kΩ. In this regard, in some embodiments, measuring resistors with a nominal value of up to 10 kΩ are conceivable. A further preferred temperature sensor is designed as a component of an integrated circuit. Such a temperature sensor is particularly preferred in connection with embodiment 6 of the device. A preferred temperature sensor is a preferably integrated semiconductor temperature sensor or a transistor or both. A preferred transistor is connected as a diode.

Pressure Sensor

All pressure sensors that are known to the skilled artisan and that appear suitable for the use of the invention may be considered as pressure sensors. Preferred pressure sensors are capacitive pressure sensors, piezoresistive pressure sensors, piezoelectric pressure sensors, pressure sensors with a Hall element, and inductive pressure sensors, as well as combinations of the aforementioned sensors. In the case that the second sensor or the third sensor is a pressure sensor, it is preferably a capacitive pressure sensor, wherein the first planar electrode and the third planar electrode form a capacitance of the capacitive pressure sensor that changes under a pressure and in accordance with the pressure of the fluid.

Planar Electrodes

All electrodes that appear suitable to the skilled artisan for the use of the invention may be considered as planar electrodes. A planar electrode preferably has a thickness that is less by a factor of at least 10, preferably of at least 50, more preferably of at least 100 than its width and its length. Particularly, at least one of the planar electrodes, preferably all, is preferably designed as a foil, film, or coating. The planar electrode in each case preferably contains a metal or carbon, preferably in the form of graphite, or both. A preferred metal is aluminum.

Substrate

Any support material that appears suitable to the skilled artisan for the purpose of the invention may be considered as the substrate. The substrate preferably gives the first electrode assembly a rigidity such that the first planar electrode remains dimensionally stable under the action of the fluid, in particular does not deform as much as possible. For this purpose, the substrate can be designed as a molded body, for example, made of plastic, brass, or stainless steel. In some embodiments, for example, in embodiment 6 of the device of the invention, the substrate can be designed additionally or alternatively as a support for a printed circuit board. In embodiments 7 and 8, the substrate is preferably designed as a spacer between the first planar electrode and the third planar electrode. A circuit board is a support for electronic components. It is used for mechanical fastening and electrical connection. For this purpose, the circuit board preferably is formed of an electrically insulating material with conductive connections (conductive traces) adhering to it. Fiber-reinforced plastic is typical as an insulating material. The conductive traces are mostly etched from a thin layer of copper; 35 µm are typical. The components are soldered, for example, on soldering surfaces (pads) or in soldering eyelets. They are simultaneously mechanically held and electrically connected in this way at these points. Larger components can also be attached to the circuit board with adhesive or screw connections.

Measuring Apparatus

A measuring apparatus is defined in the "Fundamentals of metrology" in DIN 1319 as "the totality of all measuring instruments and additional equipment to achieve a measuring result." Accordingly, a measuring apparatus contains at least one measuring device. A measuring device is a device that is provided for measuring a measurement variable. In addition to a sensor, the measuring device usually has a signal processing device for evaluating a measurement signal sensed by the sensor. Further, the measuring device can have a display for outputting a measuring result. The measuring apparatus further can have one or more auxiliary devices. An auxiliary device in a measuring apparatus is not used directly for sensing, converting, or outputting a measurement signal. Any variable that can be determined quantitatively may be considered as a measurement variable. The measurement variable can be, for example, a physical, chemical, or biological variable.

Signal Processing Device

Any device for processing a measurement signal that appears suitable to the skilled artisan for a use of the invention may be considered as the signal processing device. The signal processing device is preferably arranged and designed for processing an above-described sensor variable of one of the sensors, preferably the first sensor or the second sensor, into a measurement variable, preferably the first measurement variable or the second measurement variable. A preferred signal processing device includes a data processing device. Any data processing device that appears suitable to the skilled artisan for the use of the invention may be considered as the data processing device of the device of the invention. A preferred data processing device is an electronic data processing device. A preferred electronic data processing device is a computer. The computer contains a processor, preferably a CPU (Central Processing Unit). A preferred computer is a microcontroller. The data processing device preferably also contains a data memory. A preferred data memory is a working memory or a main memory or both.

Sanitary Apparatus

Any sanitary apparatus that appears suitable to the skilled artisan in connection with the invention may be considered as a sanitary device. A preferred sanitary apparatus can be a fitting, a toilet, a shower, a bathtub, a cooking stove, a drinking water dispenser, and a bidet, or a combination of at least two of these, wherein a fitting is particularly preferred. A preferred fitting is an electronic fitting. The electronic fitting preferably contains electronics which are arranged and designed to regulate a fluid flow or a fluid delivery or both of the fitting. For this purpose, the electronics preferably contain a control unit which is arranged and designed for controlling a valve.

Fitting

A preferred fitting herein is an inflow fitting. A preferred sanitary inflow fitting is also referred to as a faucet. A further preferred inflow fitting is a mixer tap. A preferred mixer tap is a single lever mixer. The inflow fitting can particularly preferably be operated without contact. For this purpose, the inflow fitting is preferably designed as an electronic fitting. A preferably electronic inflow fitting has a valve, a regulating unit, and a control unit, wherein the control unit is connected to the control unit in a signal-transmitting manner. Further, the control unit is preferably arranged and designed for controlling the valve. For this purpose, the control unit preferably contains an electromagnet or an electric motor or both. The control unit is preferably arranged and designed for controlling the control unit. A preferred electric motor is a linear motor or a rotary motor. A further preferred electronic fitting preferably additionally has a sensor which is connected to the control unit in a signal-transmitting manner.

Capacitor

The first capacitor or the second capacitor or both are preferably plate capacitors or film capacitors or both.

Fluid

A fluid is a flowable medium. Preferred flowable media are gases and liquids. A preferred liquid is water, preferably drinking water or industrial water. A very particularly preferred fluid is water.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
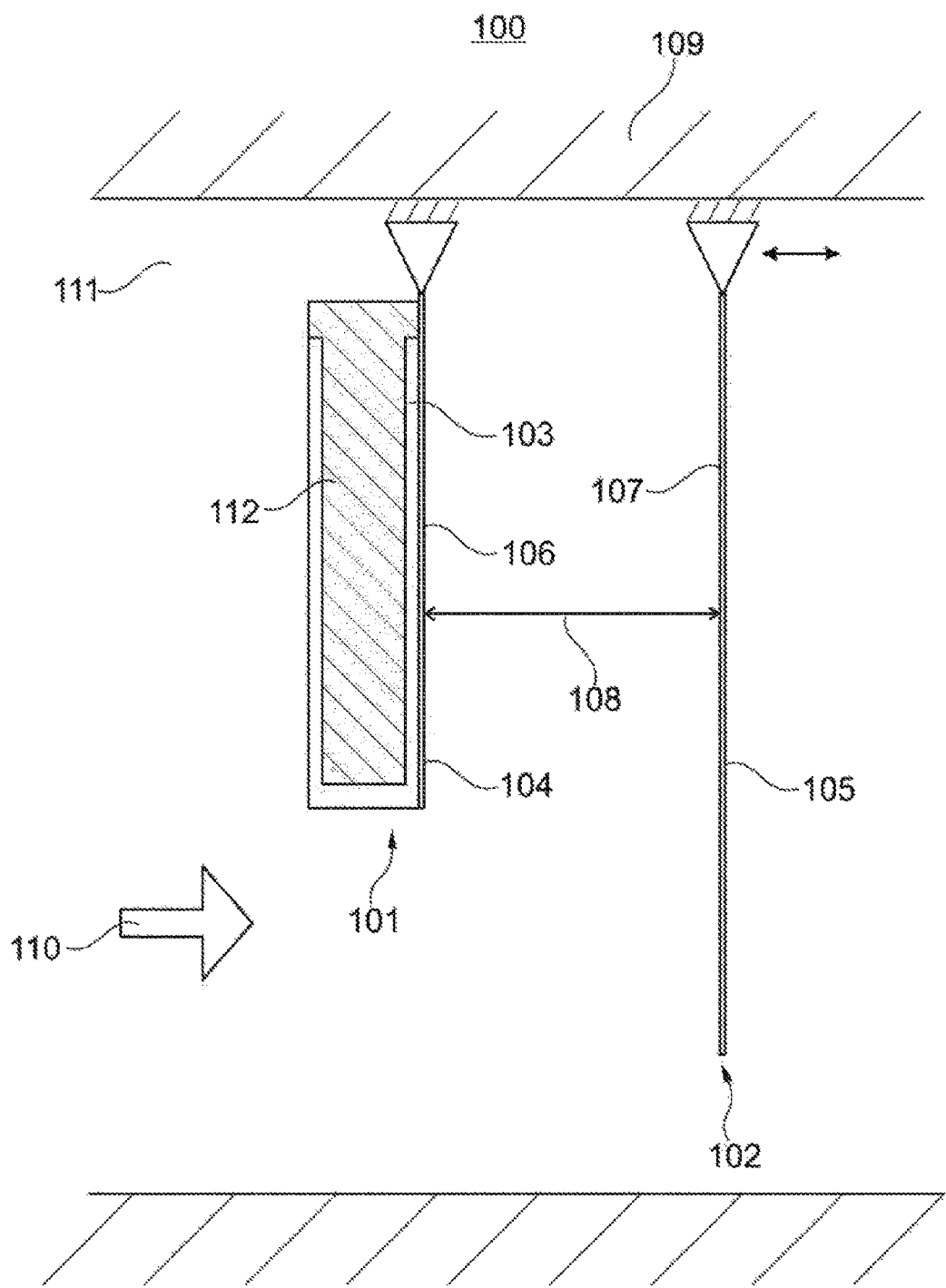
FIG. 1 shows a schematic representation of a device of the invention in cross section.

FIG. 1 shows a schematic representation of a device of the invention 100 in cross section. Device 100 is arranged in a fluid line 109, which contains a fluid 111. Fluid 111 here is water and fluid line 109 is a water pipe. A fluid flow 110 is shown in the figure by an arrow. Device 100 contains a first sensor, designed and arranged for sensing a first measurement variable of fluid 111, and a second sensor, configured and arranged for sensing a second measurement variable of fluid 111. In this regard, the first measurement variable is a flow rate of fluid 111 through fluid line 109. The second measurement variable is a temperature of fluid 111. Accordingly, the second sensor is a temperature sensor 112. Device 100 contains a first electrode assembly 101 with a substrate 103 and a first planar electrode 104 overlying substrate 103. Further, the device contains a second electrode assembly 102, containing a second planar electrode 105. First planar electrode 104 contains a first electrode surface 106 facing second planar electrode 105, and second planar electrode 105 contains a second electrode surface 107 facing first planar electrode 104. In this regard, second electrode surface 107 is larger than first electrode surface 106 so that fluid 111 can flow onto a projecting region of second electrode surface 107. Overlapping regions of first electrode surface 106 and of second electrode surface 107 determine a first capacitance of a first capacitor. First planar electrode 104 is designed here as a metal foil. Substrate 103 is a molded body made of plastic, in which temperature sensor 112, which is a Pt100 resistance temperature sensor, is partially molded in. First planar electrode 104 and second planar electrode 105 are dielectrically spaced apart from each other by a distance 108. In this regard, first planar electrode 104 and second planar electrode 105 are each provided with an enveloping dielectric (not shown) which electrically insulates the respective electrode from fluid 111. Second planar electrode 105 is designed as a plate which is so thick that the second planar electrode maintains its shape under the action of fluid flow 110. First planar electrode 104 is kept dimensionally stable by substrate 103. Second planar electrode 105 is mounted horizontally displaceable in the figure, wherein device 100 contains a spring (not shown) as a restoring element, which is arranged and designed to bring second planar electrode 105 into an equilibrium position of a mean distance from first planar electrode 104. Accordingly, first electrode assembly 101 and second electrode assembly 102 form the first capacitor as the first sensor such that the first capacitance formed by first planar electrode 104 and second planar electrode 105 can be varied under the influence of the flowing fluid 111 and in accordance with a flow velocity of fluid 111 as the first measurement variable. First electrode assembly 101 also contains temperature sensor 112 as the second sensor.

Figure 2:
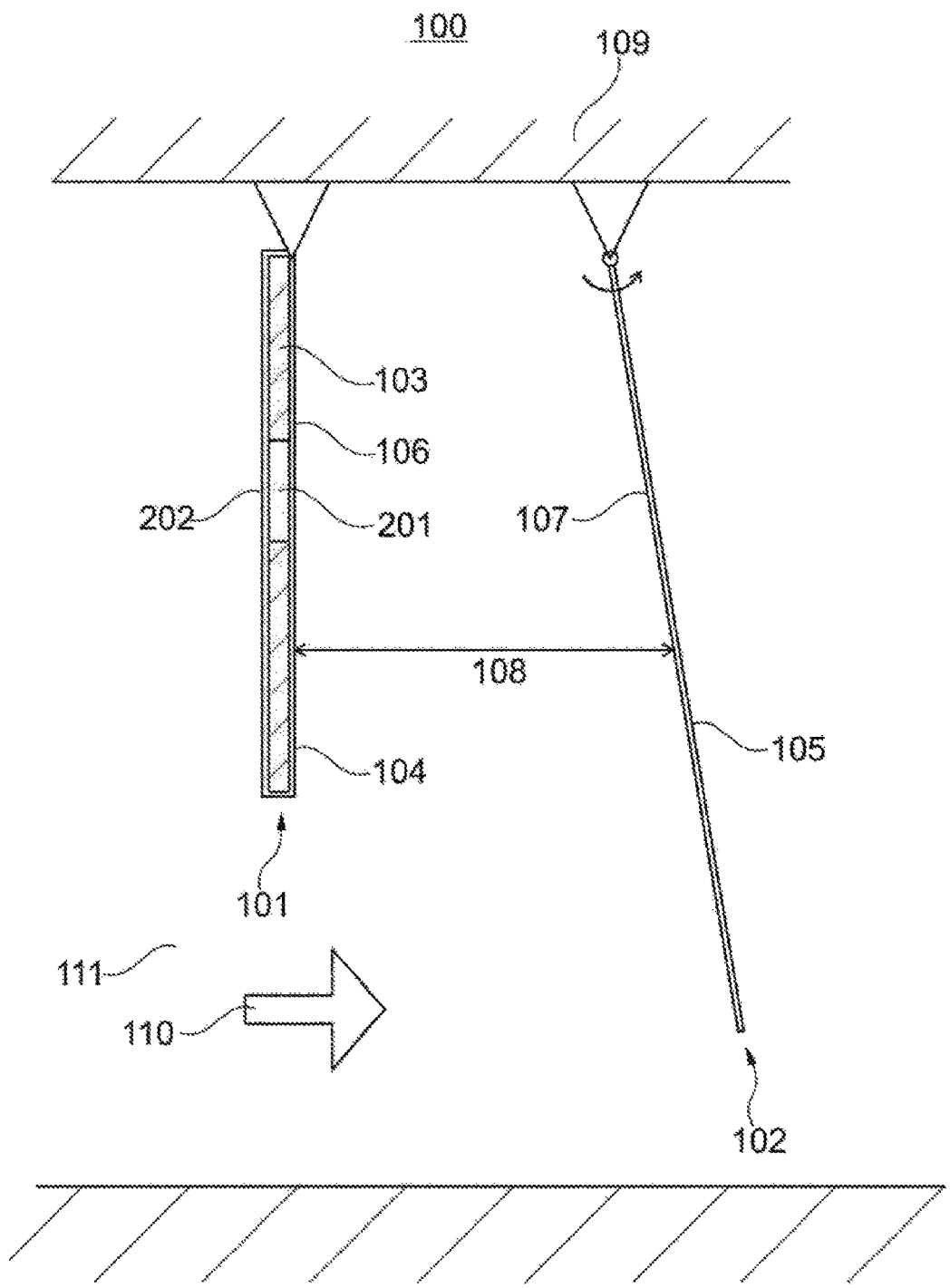
FIG. 2 shows a schematic representation of a device of the invention in cross section.

FIG. 2 shows a schematic representation of a further device of the invention 100 in cross section. Device 100 is arranged in a fluid line 109, which contains a fluid 111. Fluid 111 here is water and fluid line 109 is a water passage of a sanitary apparatus 600. A fluid flow 110 is shown in the figure by an arrow. Device 100 contains a first sensor, designed and arranged for sensing a first measurement variable of fluid 111, and a second sensor, configured and arranged for sensing a second measurement variable of fluid 111. In this regard, the first measurement variable is a flow rate of fluid 111 through fluid line 109. Second measurement variable is a pressure of fluid 111. Accordingly, the second sensor is a pressure sensor. Device 100 contains a first electrode assembly 101 with a substrate 103 and a first planar electrode 104 overlying substrate 103. Further, device 100 contains a second electrode assembly 102, containing a second planar electrode 105. First planar electrode 104 contains a first electrode surface 106 facing second planar electrode 105, and second planar electrode 105 contains a second electrode surface 107 facing first planar electrode 104. In this regard, second electrode surface 107 is larger than first electrode surface 106 so that fluid 111 can flow onto a projecting region of second electrode surface 107. Overlapping regions of first electrode surface 106 and of second electrode surface 107 determine a first capacitance of a first capacitor. First planar electrode 104 and second planar electrode 105 are each designed here as a metal foil. First electrode assembly 101 further contains a third planar electrode 202 overlying substrate 103 on a side facing away from first planar electrode 104. This is also designed as a metal foil. Substrate 103 is designed as a dimensionally stable spacer made of plastic, which dielectrically spaces apart first planar electrode 104 and third planar electrode 202. Substrate 103 partially encloses a cavity 201 between first planar electrode 104 and third planar electrode 202. For this purpose, substrate 103 has a hole which is covered by first planar electrode 103 and third planar electrode 202. First electrode assembly 101 also has a vent (not shown) for cavity 201. Such a vent can be designed, for example, as an air-conducting channel, for example, between substrate 103 and third planar electrode 202. First electrode assembly 101 thus forms a second capacitor as the second sensor. First planar electrode 104 and third planar electrode 202 form a second capacitance of the second capacitor. If first planar electrode 104 and third planar electrode 202 are pressed on one another by a pressure of fluid 111 such that cavity 201 is reduced, the second capacitance increases in accordance with the pressure. An influence of fluid flow 111 can be eliminated here by means of a measuring result obtained with the first sensor. This can be done by means of a signal processing device 601 of a measuring apparatus 602 containing device 100. Thus, the second capacitance can be varied under the influence of fluid 111 and in accordance with the pressure of fluid 111 as the second measurement variable. First planar electrode 104 and second planar electrode 105 are dielectrically spaced apart from each other by a distance 108. Second planar electrode 105 is located on a support (not shown) which ensures that second planar electrode 104 maintains its shape under the action of fluid flow 110. First planar electrode 104 is kept dimensionally stable by substrate 103, apart from the region of first planar electrode 104 that covers the hole in substrate 103. The same applies to third planar electrode 202. Second planar electrode 105 is mounted rotatable about an axis of rotation as indicated in the figure by an arrow, wherein device 100 contains a torsion spring (not shown) as a restoring element, which is arranged and designed to bring second planar electrode 105 into an equilibrium position of a medium distance from first planar electrode 104. Accordingly, first electrode assembly 101 and second electrode assembly 102 form the first capacitor as the first sensor such that the first capacitance formed by first planar electrode 104 and second planar electrode 105 can be varied under the influence of the flowing fluid 111 and in accordance with a flow velocity of fluid 111 as the first measurement variable. First electrode assembly 101 also contains the pressure sensor as the second sensor. If device 100 is to be used in an electrically conductive fluid 111, then electrodes 104, 105 are of course to be electrically insulated from fluid 111. This can be done by appropriate coatings, for example, of plastic.

Figure 3:
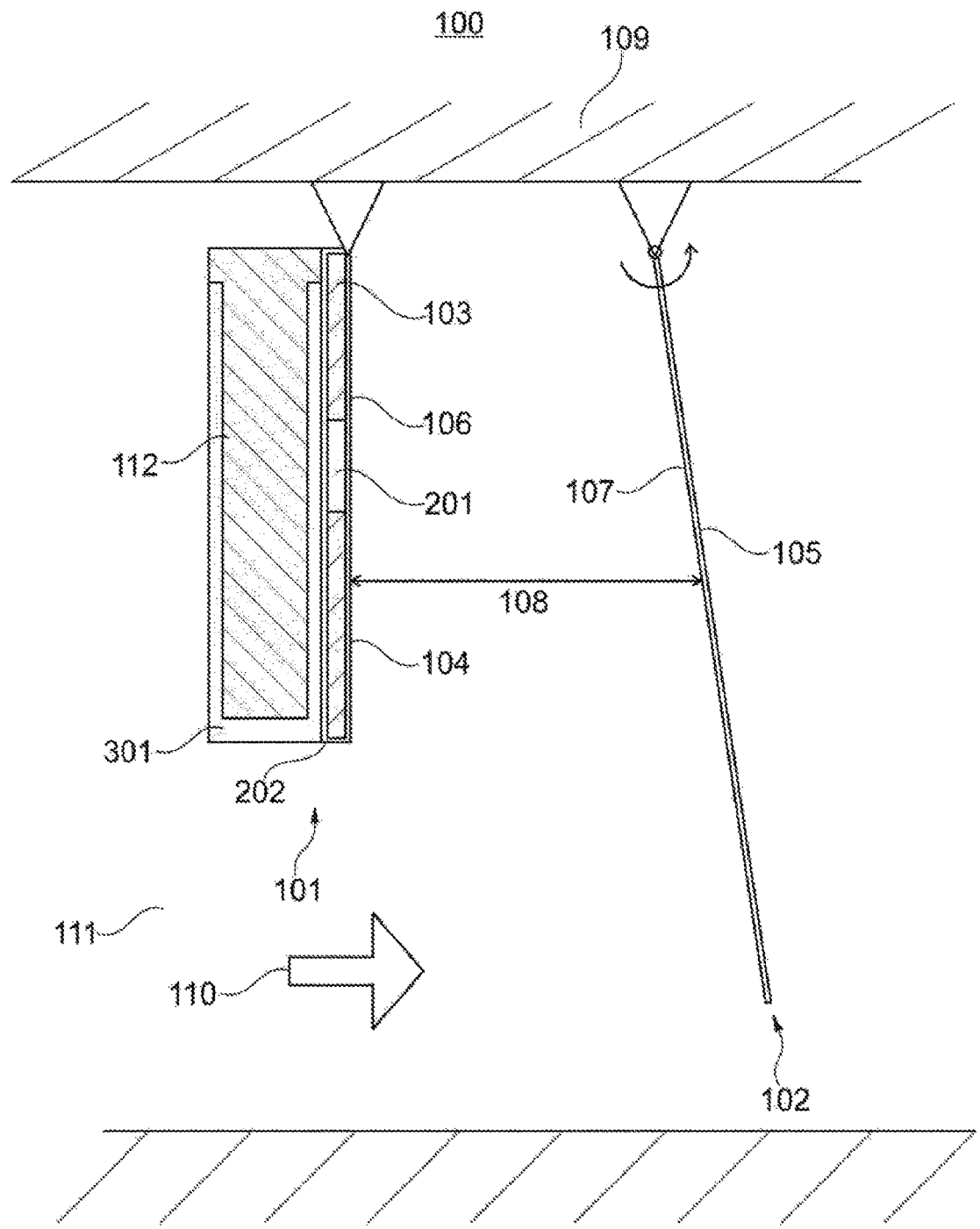
FIG. 3 shows a schematic representation of a device of the invention in cross section.

FIG. 3 shows a schematic representation of a further device of the invention 100 in cross section. Device 100 of FIG. 3 is designed and arranged like device 100 of FIG. 2, wherein device 100 of FIG. 3 in addition contains a third sensor, which is arranged and designed for sensing a third measurement variable of fluid 111. The third measurement variable is a temperature of the fluid. The third sensor is a Pt1000 resistance sensor as temperature sensor 112. Temperature sensor 112 is molded into a stator 301 so that stator 301, which is a dimensionally stable molded body made of plastic, partially surrounds temperature sensor 112. Consequently, device 100 contains 3 sensors, which can be arranged in a relatively small installation space.

Figure 4:
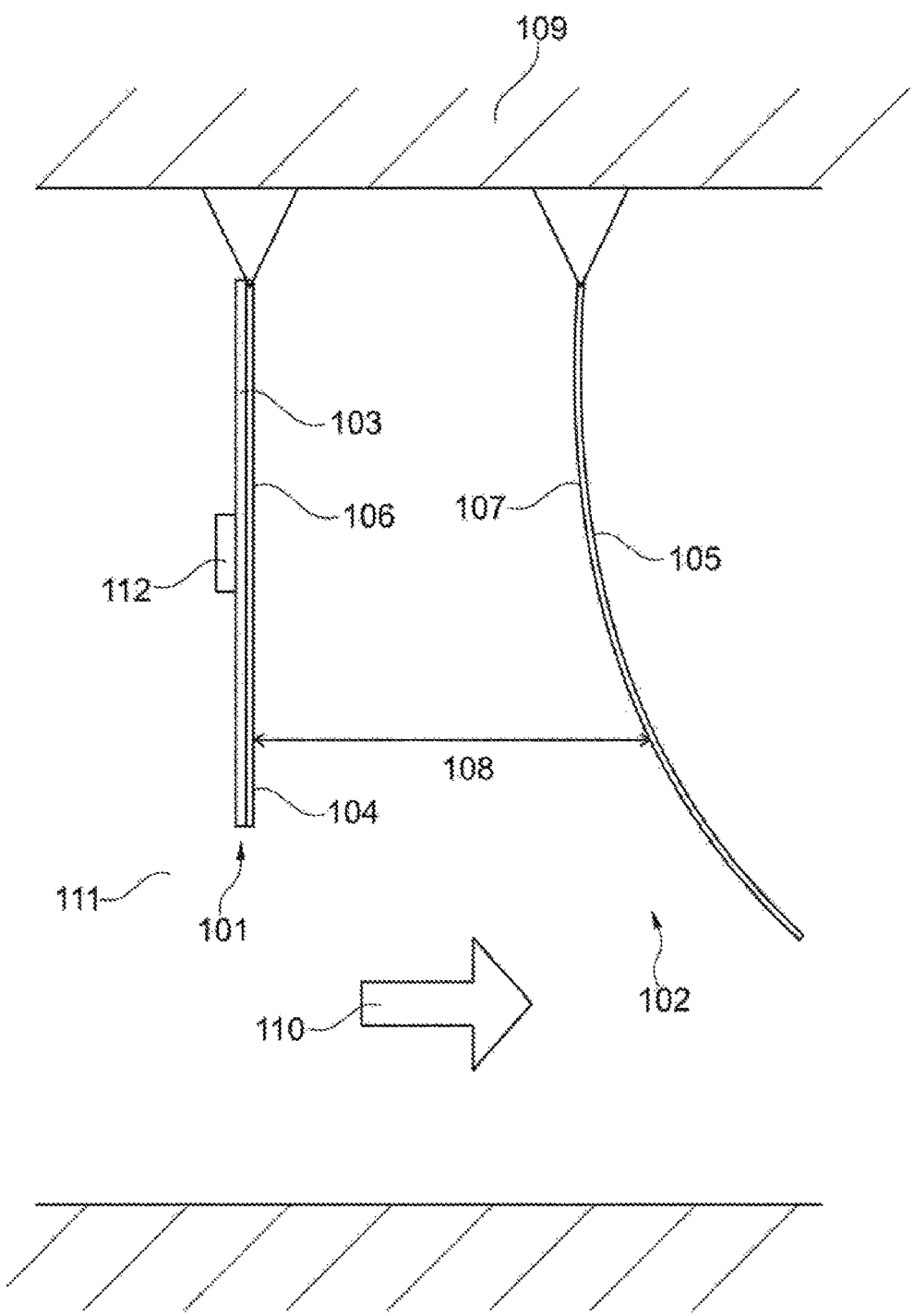
FIG. 4 shows a schematic representation of a device of the invention in cross section.

FIG. 4 shows a schematic representation of a further device of the invention 100 in cross section. Device 100 is arranged in a fluid line 109, which contains a fluid 111. Fluid 111 here is water and fluid line 109 is a water pipe. A fluid flow 110 is shown in the figure by an arrow. Device 100 contains a first sensor, designed and arranged for sensing a first measurement variable of fluid 111, and a second sensor, configured and arranged for sensing a second measurement variable of fluid 111. In this regard, the first measurement variable is a flow rate of fluid 111 through fluid line 109. The second measurement variable is a temperature of fluid 111. Accordingly, the second sensor is a temperature sensor 112. This is designed as an integrated semiconductor temperature sensor and is incorporated into an integrated circuit (not shown). Device 100 contains a first electrode assembly 101 with a substrate 103 and a first planar electrode 104 overlying substrate 103. Substrate 103 is designed here as a dimensionally stable plastic support of a printed circuit board. The circuit board contains a large number of conductive traces (not shown) as part of the integrated circuit. The conductive traces overlie substrate 103 on a side facing away from first planar electrode 104. Temperature sensor 112 overlies substrate 103 also on the side facing away from first planar electrode 104. Further, temperature sensor 112 is electrically conductively connected to at least a portion of the conductive traces. Further, the device contains a second electrode assembly 102, containing a second planar electrode 105. First planar electrode 104 contains a first electrode surface 106 facing second planar electrode 105, and second planar electrode 105 contains a second electrode surface 107 facing first planar electrode 104. In this regard, second electrode surface 107 is larger than first electrode surface 106 so that fluid 111 can flow onto a projecting region of second electrode surface 107. Overlapping regions of first electrode surface 106 and of second electrode surface 107 determine a first capacitance of a first capacitor. First planar electrode 104 and second planar electrode 105 are dielectrically spaced apart from each other by a distance 108. In this regard, first planar electrode 104 and second planar electrode 105 are each provided with an enveloping dielectric (not shown) which electrically insulates the respective electrode from fluid 111. First planar electrode 104 and second planar electrode 105 are each designed here as a metal foil. First planar electrode 104 is kept dimensionally stable against the action of fluid 111 by substrate 103. Second planar electrode 105 is located on a plastic support (not shown), which is designed so flexibly that the support with second planar electrode 105 can deform elastically, as shown in the figure, under the action of fluid 111 so as to increase by a mean distance between the two electrodes 104 and 105 in accordance with a flow velocity of fluid 111. Accordingly, first electrode assembly 101 and second electrode assembly 102 form the first capacitor as the first sensor such that the first capacitance formed by first planar electrode 104 and second planar electrode 105 can be varied under the influence of the flowing fluid 111 and in accordance with a flow velocity of fluid 111 as the first measurement variable. First electrode assembly 101 also contains temperature sensor 112 as the second sensor.

Figure 5:
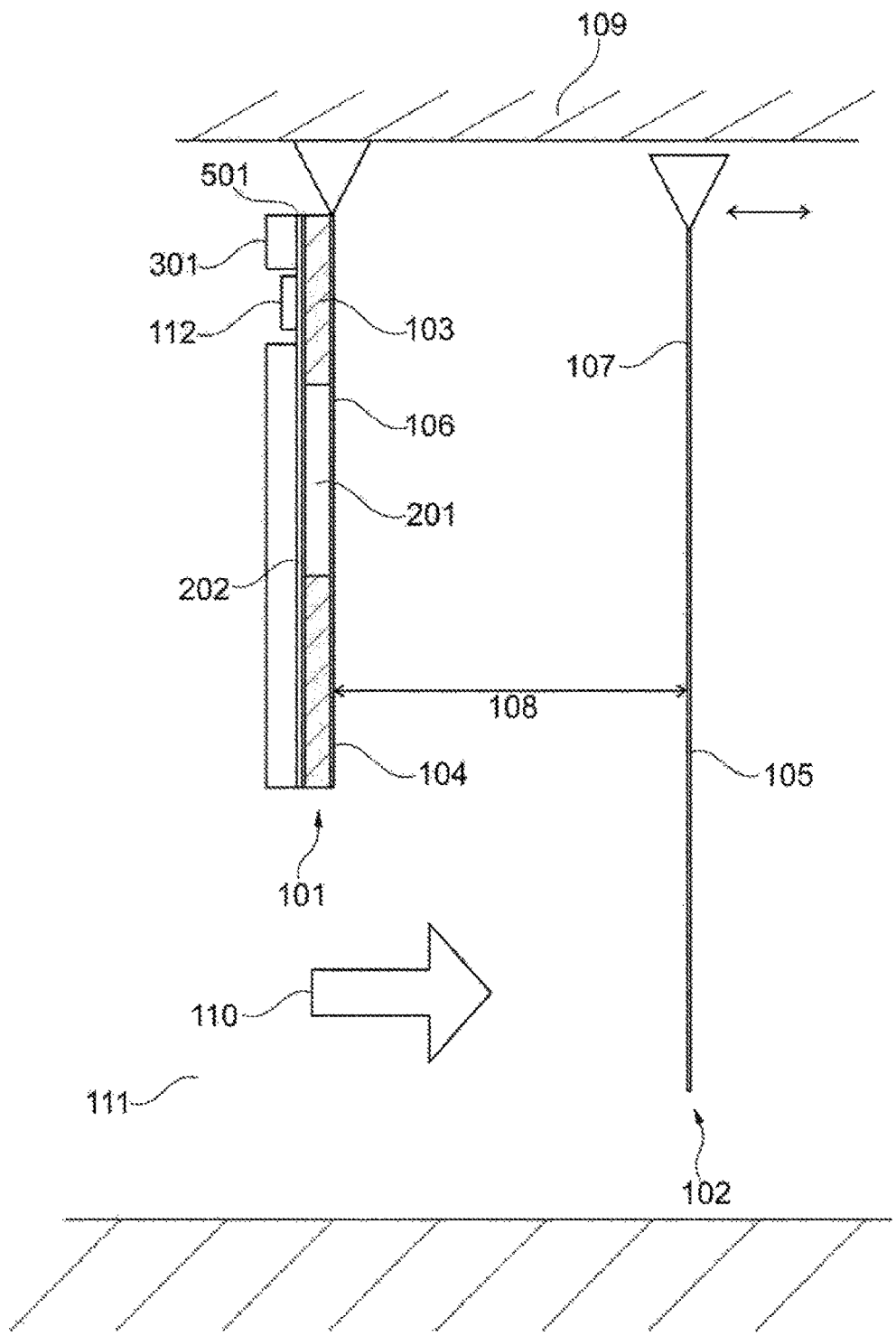
FIG. 5 shows a schematic representation of a device of the invention in cross section.

FIG. 5 shows a schematic representation of a further device of the invention 100 in cross section. Device 100 is arranged in a fluid line 109, which contains a fluid 111, directly before a sanitary apparatus 600. Fluid 111 here is water and fluid line 109 is a water pipe. A fluid flow 110 is shown in the figure by an arrow. Device 100 contains a first sensor, designed and arranged for sensing a first measurement variable of fluid 111; a second sensor, designed and arranged for sensing a second measurement variable of fluid 111; and a third sensor, designed and arranged for sensing a third measurement variable of fluid 111. In this regard, the first measurement variable is a flow rate of fluid 111 through fluid line 109. The second measurement variable is a temperature of fluid 111. Accordingly, the second sensor is a temperature sensor 112. This is designed as an integrated semiconductor temperature sensor and is incorporated into an integrated circuit (not shown). The third measurement variable is a pressure of fluid 111. Thus, the third sensor is designed as a pressure sensor. Device 100 contains a first electrode assembly 101 with a substrate 103 and a first planar electrode 104 overlying substrate 103. Further, device 100 contains a second electrode assembly 102, containing a second planar electrode 105. First planar electrode 104 contains a first electrode surface 106 facing second planar electrode 105, and second planar electrode 105 contains a second electrode surface 107 facing first planar electrode 104. In this regard, second electrode surface 107 is larger than first electrode surface 106 so that fluid 111 can flow onto a projecting region of second electrode surface 107. Second planar electrode 105 is mounted horizontally displaceable in the figure, wherein device 100 contains a spring (not shown) as a restoring element, which is arranged and designed to bring second planar electrode 105 into an equilibrium position of a mean distance from first planar electrode 104. Overlapping regions of first electrode surface 106 and of second electrode surface 107 determine a first capacitance of a first capacitor. First planar electrode 104 and second planar electrode 105 are each designed here as a metal foil. First electrode assembly 101 further contains a third planar electrode 202 overlying substrate 103 on a side facing away from first planar electrode 104. This is also designed as a metal foil. Substrate 103 is designed as a dimensionally stable spacer made of plastic, which dielectrically spaces apart first planar electrode 104 and third planar electrode 202. Substrate 103 partially encloses a cavity 201 between first planar electrode 104 and third planar electrode 202. For this purpose, substrate 103 has a hole which is covered by first planar electrode 103 and third planar electrode 202. First electrode assembly 101 also has a vent (not shown) for cavity 201. Such a vent can be designed, for example, as an air-conducting channel, for example, between substrate 103 and third planar electrode 202. First electrode assembly 101 thus forms a second capacitor as the third sensor. First planar electrode 104 and third planar electrode 202 form a second capacitance of the second capacitor. If first planar electrode 104 and third planar electrode 202 are pressed on one another by a pressure of fluid 111 such that cavity 201 is reduced, the second capacitance increases in accordance with the pressure. A printed circuit board also overlies third planar electrode 202 on a side facing away from substrate 103. In this regard, an electrically insulating layer 501 made of a plastic forms a support for the printed circuit board. The circuit board further contains a large number of conductive traces (not shown) as part of the integrated circuit. Temperature sensor 112 is fixedly connected to the circuit board and electrically conductively connected to at least a portion of the conductive traces. A stator 301, therefore, a dimensionally stable molded body, partially surrounds temperature sensor 112 so that it is protected against mechanical influences, but fluid 111 can reach temperature sensor 112 for sensing the temperature. Accordingly, first electrode assembly 101 and second electrode assembly 102 form the first capacitor as the first sensor such that the first capacitance formed by first planar electrode 104 and second planar electrode 105 can be varied under the influence of the flowing fluid 111 and in accordance with a flow velocity of fluid 111 as the first measurement variable. First electrode assembly 101 also contains temperature sensor 112 as the second sensor. Consequently, device 100 contains 3 sensors, which can be arranged in a relatively small installation space.

Figure 6:
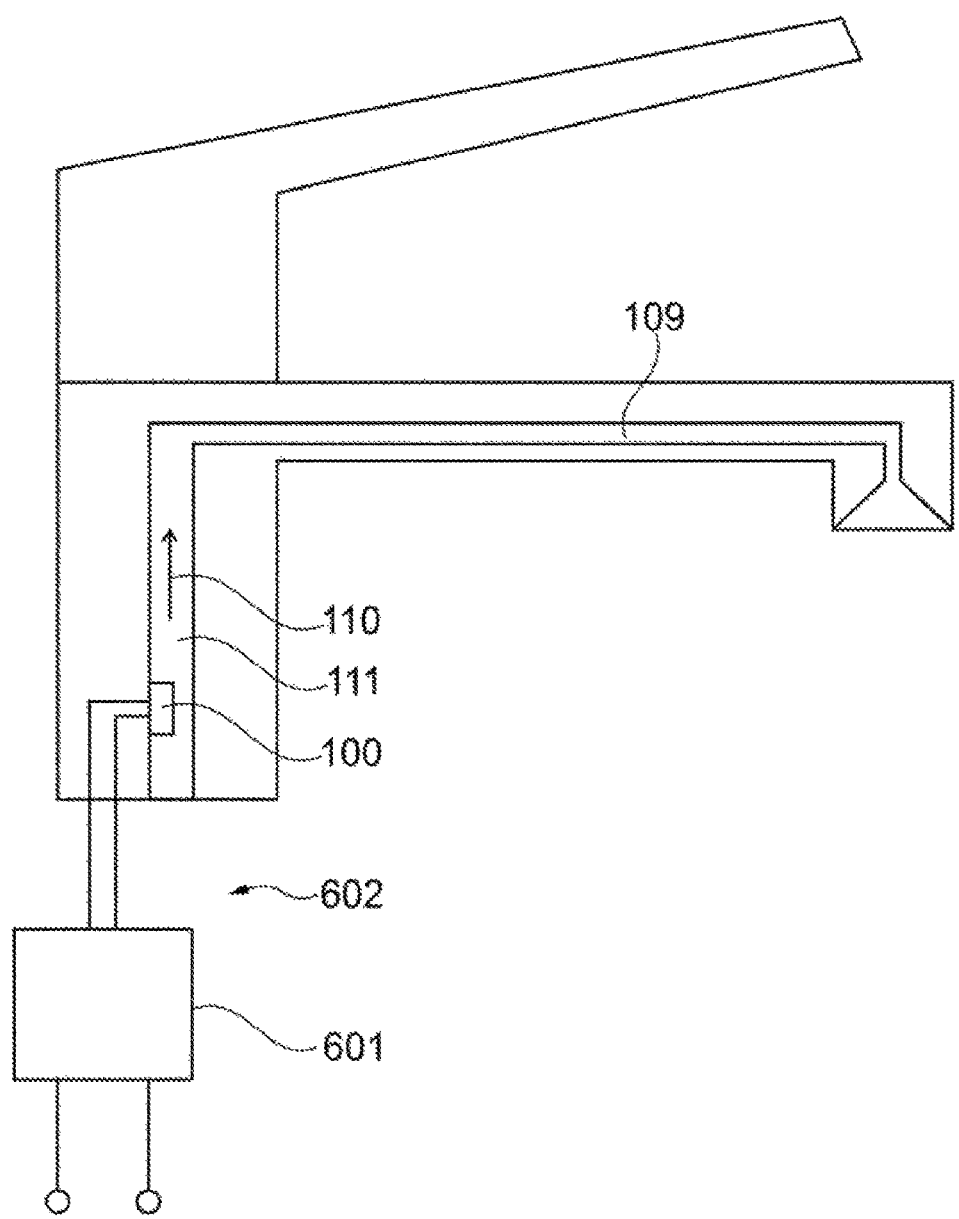
FIG. 6 shows a schematic representation of a sanitary apparatus of the invention with a measuring apparatus of the invention in cross section.

FIG. 6 shows a schematic representation of a sanitary apparatus of the invention 600 with a measuring apparatus 602 of the invention in cross section. Sanitary apparatus 600 is a fitting, more precisely a single lever mixer. The fitting has a fluid line 109 containing water as fluid 111. The water flows in fluid line 111 (fluid flow 110) to a water outlet of the fitting. A device 100 of the invention, which is contained in measuring apparatus 602, is arranged in fluid line 109. Measuring apparatus 602 further comprises a signal processing device 601, which is connected in a signal-transmitting manner to a first sensor and a second sensor of device 100. Further, measuring apparatus 602 has a power supply unit as a voltage source. Signal processing device 601 is arranged and designed for processing a measurement signal of a first measurement variable and a second measurement variable. In this regard, the first sensor is arranged and designed for sensing the first measurement variable of fluid 111 and the second sensor for sensing the second measurement variable of fluid 111.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A device comprising:
a first sensor arranged to sense a first measurement variable of a fluid;
a second sensor arranged to sense a second measurement variable of the fluid;
a first electrode assembly comprising a substrate and a first planar electrode overlying the substrate; and
a second electrode assembly comprising a second planar electrode,
wherein the first planar electrode and the second planar electrode are dielectrically spaced apart from each other,
wherein the first electrode assembly and the second electrode assembly together form a first capacitor, the first capacitor being the first sensor such that a first capacitance, formed by the first planar electrode and the second planar electrode, is varied under the influence of the fluid and in accordance with a flow velocity of the fluid, the flow velocity of the fluid being the first measurement variable,
wherein the first electrode assembly contains the second sensor,
wherein the substrate at least partially surrounds the second sensor,
wherein the device contains a third sensor, designed and arranged for sensing a third measurement variable of the fluid, wherein the first electrode assembly contains a third planar electrode overlying the substrate on a side facing away from the first planar electrode, wherein the substrate dielectrically spaces apart the first planar electrode and the third planar electrode from each other, wherein the first electrode assembly forms a second capacitor as the third sensor, wherein the first planar electrode and the third planar electrode form a second capacitance of the second capacitor, and wherein the substrate is arranged and designed so that the second capacitance is adapted to be varied under the influence of the fluid and in accordance with a pressure of the fluid as the third measurement variable.

2. The device according to claim 1, wherein the substrate at least partially encloses a cavity between the first planar electrode and the third planar electrode.

3. A device comprising:
a first sensor arranged to sense a first measurement variable of a fluid;
a second sensor arranged to sense a second measurement variable of the fluid;
a first electrode assembly comprising a substrate and a first planar electrode overlying the substrate; and
a second electrode assembly comprising a second planar electrode,
wherein the first planar electrode and the second planar electrode are dielectrically spaced apart from each other,
wherein the first electrode assembly and the second electrode assembly together form a first capacitor, the first capacitor being the first sensor such that a first capacitance, formed by the first planar electrode and the second planar electrode, is varied under the influence of the fluid and in accordance with a flow velocity of the fluid, the flow velocity of the fluid being the first measurement variable,
wherein the first electrode assembly contains the second sensor, wherein the first electrode assembly contains a third planar electrode overlying the substrate on a side facing away from the first planar electrode, wherein the substrate dielectrically spaces apart the first planar electrode and the third planar electrode from each other, wherein the first electrode assembly forms a second capacitor as the second sensor, wherein the first planar electrode and the third planar electrode form a second capacitance of the second capacitor, and wherein the substrate is arranged and designed so that the second capacitance is adapted to be varied under the influence of the fluid and in accordance with a pressure of the fluid as the second measurement variable.

4. The device according to claim 3, wherein the device is arranged in a fluid line designed to conduct the fluid.

5. The device according to claim 3, wherein the fluid line is contained in a sanitary apparatus.

6. The device according to claim 3, wherein the substrate at least partially surrounds the second sensor.

7. The device according to claim 3, wherein the substrate is overlaid with at least one electrical conductive trace on a side facing away from the first planar electrode, and wherein the second sensor overlies the substrate on a side facing away from the first planar electrode and is electrically conductively connected to the at least one electrical conductive trace.

8. A measuring apparatus comprising:
the device according to claim 3; and a signal processing device, the signal processing device being arranged and designed for processing a measurement signal of the first measurement variable or the second measurement variable or both and is connected in a signal-transmitting manner to the first sensor or the second sensor or both.

9. A sanitary apparatus comprising the device according to claim 3.

10. The device according to claim 3, wherein the device is integrated in a fluid line.

11. The device according to claim 3, wherein the second planar electrode is pivotable or horizontally displaceable towards and away from the first planar electrode.

* * * * *